US011165230B1

(12) United States Patent
Jordan et al.

(10) Patent No.: US 11,165,230 B1
(45) Date of Patent: Nov. 2, 2021

(54) ROLLER ASSEMBLY FOR USE WHEN DRAWING A CABLE THROUGH A CABLE TRAY

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 0 days.

(21) Appl. No.: 15/330,174

(22) Filed: Aug. 18, 2016

(51) Int. Cl.

| H02G 1/02 | (2006.01) |
|---|---|
| B65G 39/12 | (2006.01) |
| F16L 3/16 | (2006.01) |
| F16L 3/18 | (2006.01) |
| F16L 3/24 | (2006.01) |
| F16L 3/20 | (2006.01) |

(Continued)

(52) U.S. Cl.
CPC ............... *H02G 1/02* (2013.01); *B65G 39/12* (2013.01); *F16L 3/16* (2013.01); *F16L 3/18* (2013.01); *F16L 3/20* (2013.01); *F16L 3/24* (2013.01); *F16L 3/243* (2019.08); *H02G 1/06* (2013.01); *H02G 1/08* (2013.01); *H02G 3/0456* (2013.01); *H02G 11/02* (2013.01)

(58) Field of Classification Search
CPC ... F16L 3/18; F16L 1/0243; F16L 3/16; F16L 3/24; F16L 3/26; F16L 3/012; F16L 3/243; F16L 3/00; H02G 1/08; H02G 1/04; H02G 3/0456; H02G 11/02; H02G 1/06; B65G 39/00; B65G 39/12
USPC ...................... 248/55, 68.1, 58, 63; 138/106; 242/157 R; 254/134.3 PA, 395, 396, 400, 254/402, 405, 413
See application file for complete search history.

(56) References Cited

U.S. PATENT DOCUMENTS

| 809,227 A | * | 1/1906 | Steckel ................ B65G 39/125 198/826 |
| 1,524,310 A | * | 1/1925 | Post ........................ B61L 7/021 248/55 |

(Continued)

FOREIGN PATENT DOCUMENTS

| GB | 269720 A | * | 4/1927 | ............... H02G 1/08 |
| GB | 735822 A | * | 8/1955 | ................ F16L 3/18 |

*Primary Examiner* — Jonathan Liu
*Assistant Examiner* — Taylor L Morris
(74) *Attorney, Agent, or Firm* — Michael E. McKee

(57) ABSTRACT

A roller assembly for facilitating the drawing of a cable along a cable tray having a transversely-extending strut includes one roller having a rotation axis and an elongated attachment portion having a cross-sectional shape which is substantially U-shaped in form. The attachment portion is positionable about the transversely-extending strut of the cable tray by directing the opening of the U of the cross-sectional shape of the attachment portion over the strut. A fastener is used to bind the attachment portion to the strut. A second roller can mounted upon the attachment portion for rotation about an axis which is substantially normal to the rotation axis of the one roller for use at a corner or curve of the tray, and the componentry of the assembly facilitates the construction of a roller-bearing apparatus providing a multi-sided passageway through which a cable can be drawn.

11 Claims, 7 Drawing Sheets

(51) Int. Cl.
  *H02G 1/06* (2006.01)
  *H02G 11/02* (2006.01)
  *H02G 3/04* (2006.01)
  *H02G 1/08* (2006.01)

(56) References Cited

U.S. PATENT DOCUMENTS

| | | | | |
|---|---|---|---|---|
| 1,599,666 A * | 9/1926 | Manley | B66D 3/06 | 254/395 |
| 2,103,811 A | 12/1937 | Davis | | |
| 2,174,193 A * | 9/1939 | Mickelson | B65H 57/14 | 193/38 |
| 2,786,092 A * | 3/1957 | Gage | H02G 1/04 | 174/40 R |
| 2,816,734 A * | 12/1957 | Crofoot | B65H 75/4402 | 114/181 |
| 2,893,669 A * | 7/1959 | Kindorf | F16L 3/18 | 248/55 |
| 2,905,416 A * | 9/1959 | Wiegand | H02G 1/08 | 248/58 |
| 2,946,559 A * | 7/1960 | Pickett | B65H 57/14 | 254/134.3 PA |
| 2,949,279 A * | 8/1960 | Eitel | F16H 7/18 | 254/397 |
| 2,991,807 A * | 7/1961 | Turner | F16L 57/00 | 138/113 |
| 3,070,355 A * | 12/1962 | Wyatt | B63B 21/10 | 254/134.3 R |
| 3,174,590 A * | 3/1965 | Haker | E04C 2/26 | 52/463 |
| 3,223,384 A * | 12/1965 | Gebo | H02G 1/08 | 254/134.3 FT |
| 3,326,529 A * | 6/1967 | Migeot | B61B 12/02 | 254/397 |
| 3,379,397 A * | 4/1968 | Keady | F16F 7/108 | 248/544 |
| 3,426,988 A * | 2/1969 | Bradshaw | H02G 1/04 | 138/106 |
| 3,545,724 A * | 12/1970 | Wright | H02G 1/04 | 254/134.3 PA |
| 3,602,467 A * | 8/1971 | Thomas | H02G 1/08 | 248/210 |
| 3,637,175 A * | 1/1972 | McElroy | H02G 1/08 | 248/55 |
| 3,770,233 A | 11/1973 | McElroy | | |
| 3,813,179 A * | 5/1974 | Priest | E04B 1/24 | 403/348 |
| 4,221,365 A * | 9/1980 | Brunskole | F16L 3/26 | 248/55 |
| 4,241,826 A * | 12/1980 | Billington | B65G 21/02 | 198/825 |
| 4,245,738 A * | 1/1981 | Butcher | B65G 21/14 | 198/812 |
| 4,270,721 A * | 6/1981 | Mainor, Jr. | G01C 15/00 | 248/228.6 |
| 4,479,453 A * | 10/1984 | Bonassi | B63B 21/10 | 114/218 |
| 4,907,782 A * | 3/1990 | Hoekstra | H02G 1/04 | 248/218.4 |
| 5,051,047 A * | 9/1991 | Loncaric | B60P 7/0815 | 24/265 CD |
| 5,064,172 A * | 11/1991 | Hereford | H02G 1/04 | 254/134.3 PA |
| 5,163,642 A * | 11/1992 | Torrens | F16L 3/00 | 248/49 |
| 5,193,663 A * | 3/1993 | Kuroda | B65G 15/08 | 198/819 |
| 5,341,920 A * | 8/1994 | Riffe | B65G 39/12 | 198/825 |
| 5,509,671 A * | 4/1996 | Campbell | B62B 1/264 | 242/557 |
| 5,529,171 A * | 6/1996 | Langenbeck | B65G 21/02 | 198/860.1 |
| 5,564,659 A * | 10/1996 | DeCapo | F16L 3/24 | 248/72 |
| 5,573,226 A * | 11/1996 | Smith | B65H 57/14 | 226/196.1 |
| 5,595,363 A * | 1/1997 | De Leebeeck | F16L 3/24 | 248/72 |
| 5,657,857 A * | 8/1997 | Neilson | B65G 15/00 | 193/35 R |
| 5,779,198 A * | 7/1998 | Rutherford | E21F 17/02 | 248/49 |
| 5,829,718 A * | 11/1998 | Smith | F16L 3/18 | 248/55 |
| 6,042,061 A * | 3/2000 | Shimizu | H02G 1/06 | 193/37 |
| 6,044,965 A * | 4/2000 | Clark | B65G 21/08 | 198/493 |
| 6,109,561 A * | 8/2000 | Haines | H02G 1/08 | 242/598.3 |
| 6,195,066 B1 * | 2/2001 | Pegues, Jr. | H01Q 1/1221 | 248/237 |
| 6,364,256 B1 * | 4/2002 | Neider | F16L 3/18 | 248/55 |
| 6,427,828 B1 * | 8/2002 | East | B65G 39/12 | 198/826 |
| 6,517,052 B1 * | 2/2003 | Lake | H02G 1/06 | 254/134.3 PA |
| 6,533,248 B1 * | 3/2003 | Schafer | B65H 49/32 | 254/134.3 FT |
| 6,543,607 B2 * | 4/2003 | Fischer | B65G 21/2054 | 198/823 |
| 6,612,516 B1 * | 9/2003 | Haines | B65H 49/32 | 242/397.1 |
| 6,634,490 B2 * | 10/2003 | Fischer | B65G 21/2054 | 198/820 |
| 6,663,054 B2 * | 12/2003 | Robicheau | F16L 3/26 | 248/49 |
| 6,672,567 B1 * | 1/2004 | Chembars | H02G 1/08 | 254/134.3 FT |
| 6,682,253 B2 * | 1/2004 | Binna | A47B 57/26 | 403/263 |
| 6,729,606 B1 * | 5/2004 | Durin | B65H 57/14 | 242/615.2 |
| 6,974,276 B2 * | 12/2005 | Kirchner | A47B 57/54 | 403/385 |
| 7,007,929 B2 * | 3/2006 | Kwon | H02G 1/04 | 226/190 |
| 7,216,850 B2 * | 5/2007 | Kwon | H02G 1/02 | 248/219.4 |
| 7,481,464 B2 * | 1/2009 | Fusser | F16L 3/18 | 248/55 |
| 7,654,492 B2 * | 2/2010 | Balderama | B64C 1/406 | 248/72 |
| 7,699,274 B2 * | 4/2010 | Riibe | F16L 3/18 | 248/55 |
| 7,762,387 B2 * | 7/2010 | Dunn | B65G 39/16 | 198/823 |
| 7,950,520 B2 * | 5/2011 | Mott | B65G 39/12 | 198/826 |
| 8,028,824 B2 * | 10/2011 | Gorshe | B65G 15/00 | 198/842 |
| 8,052,098 B1 * | 11/2011 | Kowaleski | E04D 15/00 | 248/237 |
| 8,087,623 B2 * | 1/2012 | Suddarth | B60R 11/0229 | 248/122.1 |
| 8,210,344 B2 * | 7/2012 | Croftcheck | B65G 21/20 | 198/830 |
| 8,282,078 B2 * | 10/2012 | Ballard | H02G 1/06 | 254/134.3 R |
| 8,282,080 B2 * | 10/2012 | Ballard | H02G 1/06 | 254/134.3 FT |
| 8,342,483 B1 * | 1/2013 | Manning | H02G 1/08 | 254/134.3 FT |
| 8,413,933 B2 * | 4/2013 | Benne | F16L 3/11 | 248/62 |

(56) References Cited

U.S. PATENT DOCUMENTS

| | | | | |
|---|---|---|---|---|
| 8,958,681 B2* | 2/2015 | Ripplinger | ............... | G02B 6/46 |
| | | | | 385/136 |
| 9,066,585 B2* | 6/2015 | Kirby | ....................... | B65G 1/02 |
| 9,517,891 B1* | 12/2016 | Van Zee | ................. | B65G 39/12 |
| 9,774,177 B1* | 9/2017 | Avillan-Carrion | ....... | H02G 1/06 |
| 2004/0079621 A1* | 4/2004 | Mott | ....................... | B65G 39/12 |
| | | | | 198/823 |
| 2005/0129458 A1* | 6/2005 | Hoffmann | ............... | F16B 7/187 |
| | | | | 403/256 |
| 2007/0200039 A1* | 8/2007 | Petak | ..................... | H02G 3/125 |
| | | | | 248/219.1 |
| 2009/0236477 A1* | 9/2009 | Oh | ............................ | H02G 1/04 |
| | | | | 248/65 |
| 2011/0108700 A1* | 5/2011 | Wheeler | ................... | F16L 3/20 |
| | | | | 248/636 |
| 2013/0026429 A1* | 1/2013 | Jordan | ...................... | H02G 1/08 |
| | | | | 254/134.3 R |
| 2014/0150687 A1* | 6/2014 | Shaw | ................... | H02G 3/0456 |
| | | | | 105/329.1 |
| 2014/0339381 A1* | 11/2014 | Weldon | .................. | A47K 3/004 |
| | | | | 248/126 |
| 2015/0232280 A1* | 8/2015 | Pietsch | .................. | B65G 39/12 |
| | | | | 248/58 |
| 2015/0322669 A1* | 11/2015 | Shih | .......................... | E04B 1/40 |
| | | | | 52/698 |
| 2015/0353319 A1* | 12/2015 | Henderson | ........... | H02G 3/0456 |
| | | | | 248/68.1 |
| 2015/0362093 A1* | 12/2015 | Henderson | ........... | F16M 13/022 |
| | | | | 248/55 |
| 2017/0362040 A1* | 12/2017 | Wetters | .................. | B65G 13/07 |
| 2018/0187411 A1* | 7/2018 | Shang | ....................... | E04B 1/40 |

\* cited by examiner

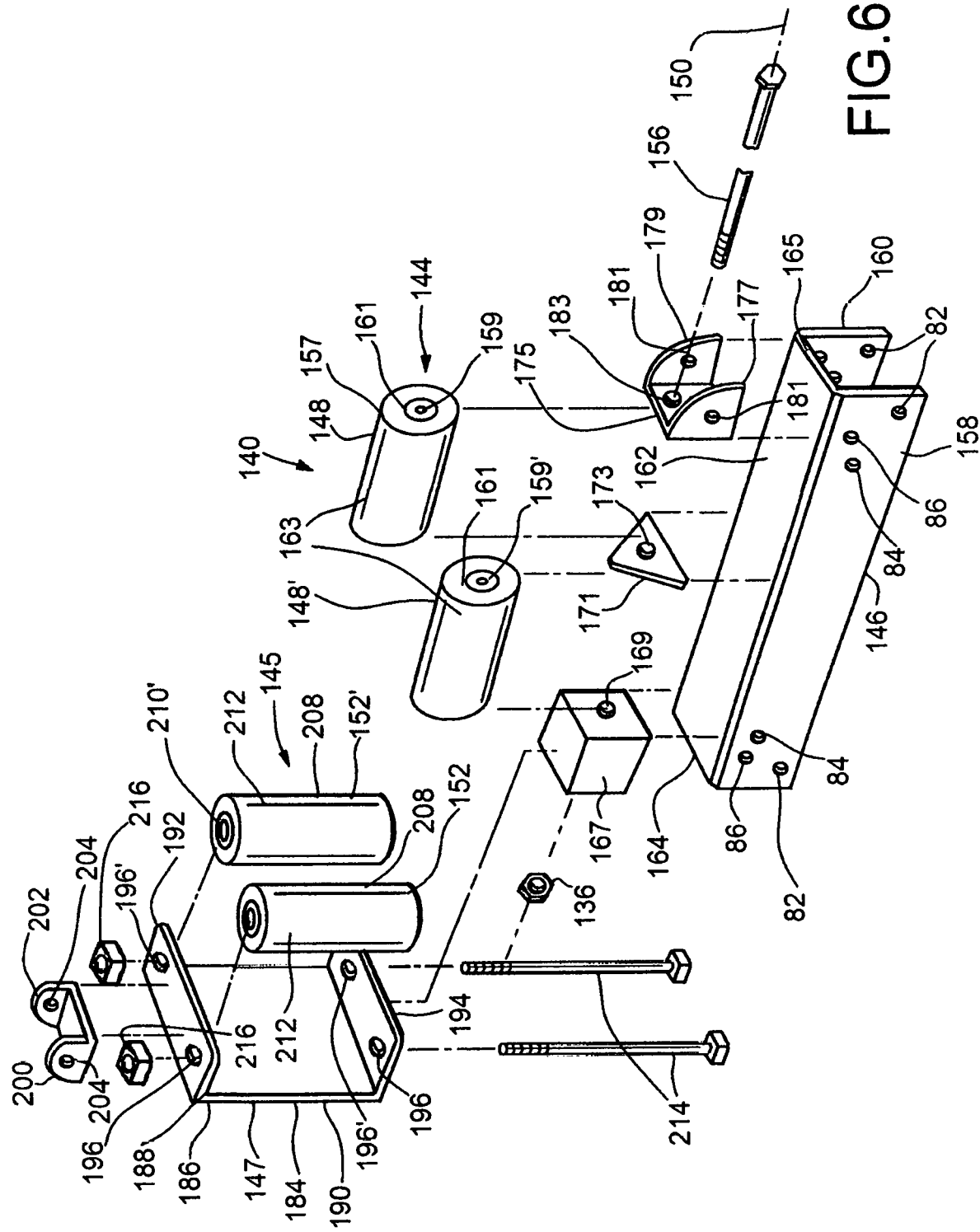

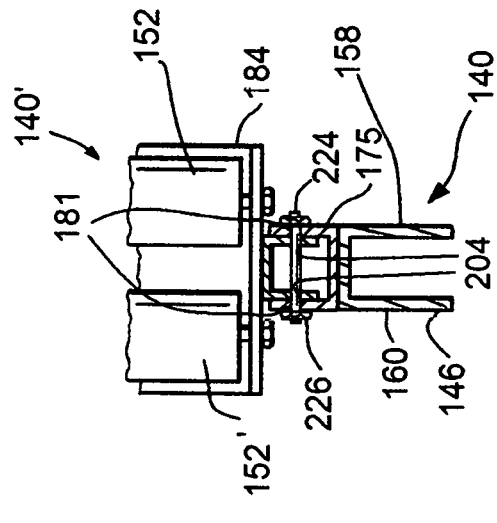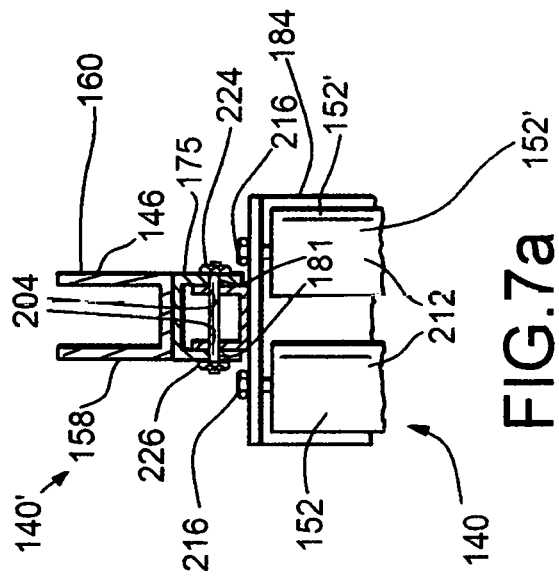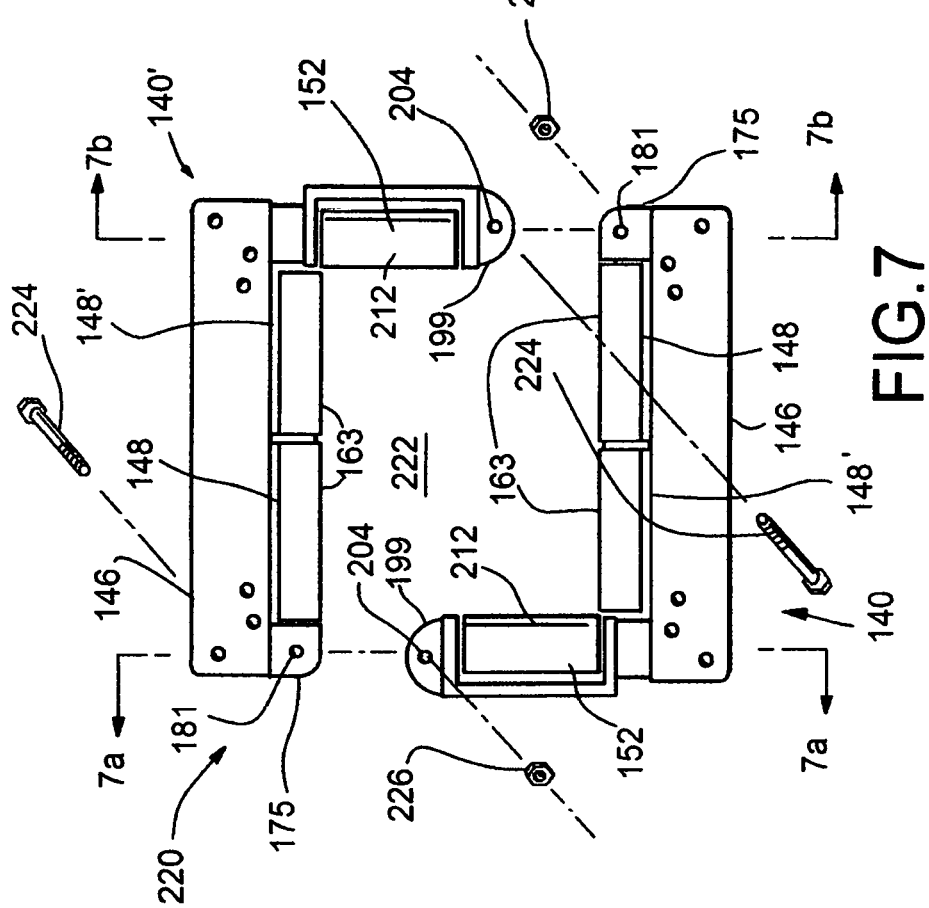

ROLLER ASSEMBLY FOR USE WHEN DRAWING A CABLE THROUGH A CABLE TRAY

BACKGROUND OF THE INVENTION

This invention relates generally to means and methods by which a cable is routed along a cable tray and relates, more particularly, to apparatus having surfaces which are acted against as a cable is drawn through a cable tray.

Cable tray systems are capable of supporting insulated electrical cables, or wires, throughout a building and can often provide an acceptable alternative to cable-supporting schemes which involve open wiring or electrical conduit systems. In this regard and when it is desirable to change the cable, or wiring, system within a building, new cables can be drawn into place along a cable tray during installation, rather than having to be pulled through a conduit or pipe.

The class of tray systems with which this invention is concerned includes those of a ladder-style construction having a plurality of spaced-apart transverse rungs, or struts, upon which a cable is adapted to lie when installed. There are known to exist cable-engaging rollers for reducing the amount of friction generated as a cable is pulled, or drawn, into place along the length of the tray. Examples of such cable-engaging rollers are shown and described in U.S. Pat. Nos. 2,103,811, 3,426,988, 3,602,467 and 3,770,233.

It is an object of the present invention to provide a new and improved roller assembly which provides cable-engaging surfaces positionable within a cable tray of the aforedescribed class to facilitate the drawing of a cable along the length of the tray.

Another object of the present invention is to provide such a roller assembly which utilizes an improved scheme for securing the roller assembly to a cable tray.

Still another object of the present invention is to provide such a roller assembly whose construction enables the assembly to be readily attached to or detached from a cable tray.

Yet still another object of the present invention is to provide such a roller assembly whose construction is well-suited for use along a straight section of, along a curve or at a corner of, or along a change in elevation of the cable tray.

A further object of the present invention is to provide such a roller assembly whose construction accommodates the stacking of roller assemblies of like construction to form a resulting apparatus which provides, for example, a multi-sided passageway through which a cable can be drawn.

One more object of the present invention is to provide such a roller assembly which is uncomplicated in structure, yet effective in operation.

SUMMARY OF THE INVENTION

This invention resides in a roller assembly for facilitating the drawing of a cable along a cable tray having at least one transversely-extending strut having a longitudinal axis.

The roller assembly includes a roller having a peripheral surface which is capable of being engaged by a cable drawn across the roller and further includes an elongated attachment portion having a longitudinal axis and a cross-sectional shape which is substantially U-shaped in form having a pair of substantially parallel legs and a base which extends between the two legs. Furthermore, the attachment portion is positionable about a transversely-extending strut of the cable tray by directing the opening of the U of the cross-sectional shape of the attachment portion over the strut. The assembly also includes means for attaching the roller to the attachment portion to permit the roller to rotate with respect to the attachment portion, and a fastener is provided for binding at least one leg of the attachment portion to the elongated strut when the strut is accepted by the U of the cross-sectional shape of the attachment portion to thereby secure the attachment portion to the transversely-extending strut.

In a particular embodiment of the roller assembly, the attachment portion has two opposite ends and the roller is a first roller which is adapted to rotate about a first rotational axis, and the roller assembly further includes a bracket which is mounted upon the attachment portion adjacent one of its two opposite ends and a second roller having a peripheral surface which is capable of being engaged by a cable drawn across the second roller and which is rotatably mounted upon the bracket for rotation with respect thereto about a second rotational axis. The bracket is attached to the attachment portion so that the rotation axis of the second roller is arranged in a substantially normal relationship to the first rotation axis so that the peripheral surfaces of the first and second rollers collectively provide two sides of a multi-sided cable-accepting passageway through which a cable can be drawn.

BRIEF DESCRIPTION OF THE DRAWINGS

FIG. 6 is a perspective view of the FIG. 5 roller assembly, shown exploded.

FIG. 7 is a frontal view of still another embodiment of a roller assembly within which features of the present invention are incorporated, shown exploded.

FIG. 7a is a cross-sectional view of a fragment of the roller assembly of FIG. 7 taken along line 7a-7a of FIG. 7.

FIG. 7b is a cross-sectional view of a fragment of the roller assembly of FIG. 7 taken along line 7b-7b of FIG. 7.

DETAILED DESCRIPTION OF AN ILLUSTRATIVE EMBODIMENT

Figure 1:
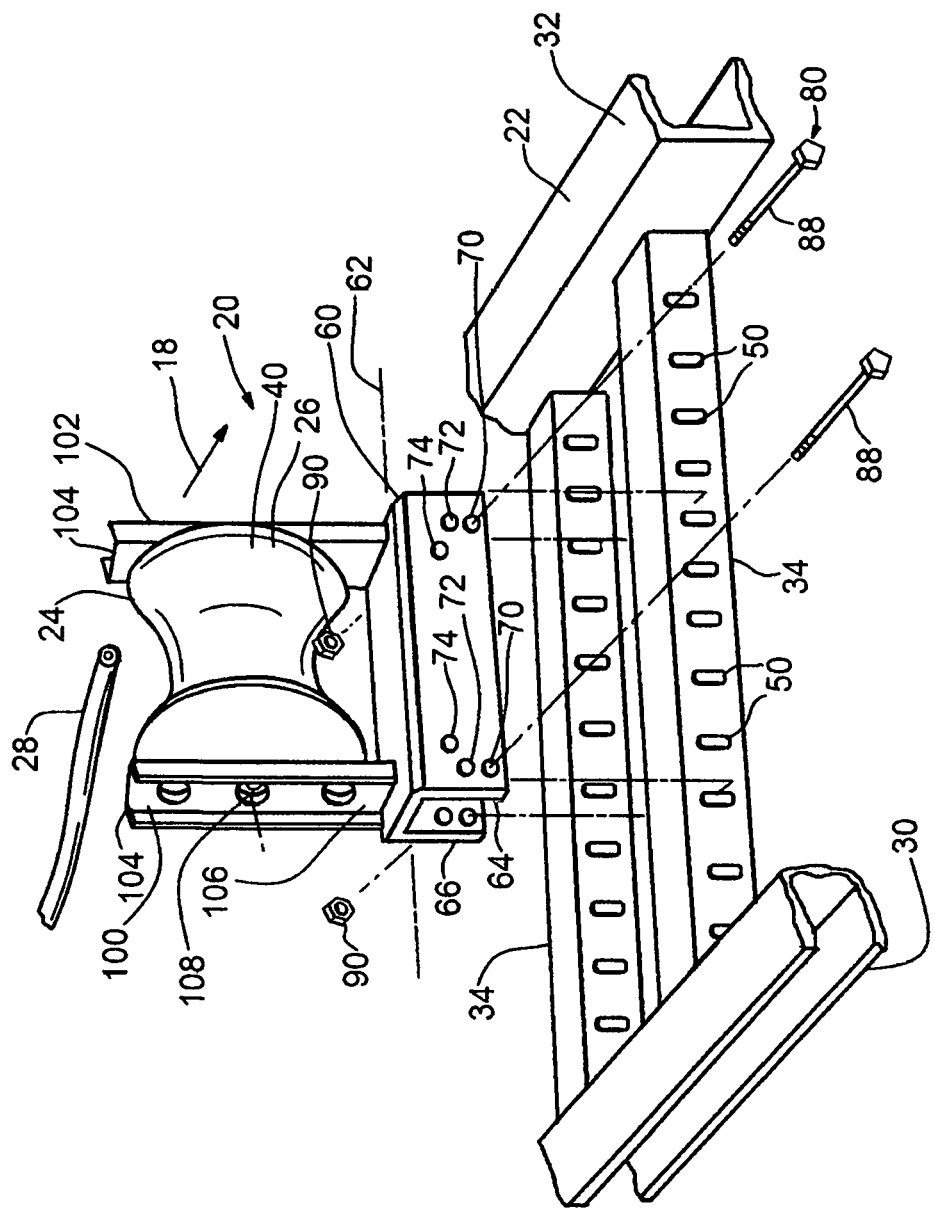
FIG. 1 is a perspective view of an embodiment of a roller assembly within which features of the present invention are incorporated and a fragment of a cable tray upon which the roller assembly is secured.

Turning now to the drawings in greater detail and considering first FIG. 1, there is illustrated an embodiment, generally indicated 20, of a roller assembly within which features of the present invention are embodied and shown secured to a cable tray 22 which is adapted to support an electrical cable, such as a cable 28, routed throughout a building. The roller assembly 20 includes a roller 24 (e.g. at least one roller) having a peripheral surface 26 along which a cable, such as the cable 28, can be routed during the pulling or drawing of the cable 28 along the length of the tray 22 (for example, in the direction indicated by the arrow 18) during a cable-installation process. In this connection and during a cable-installation process, the cable 28 is routed across the peripheral surface 26 of the roller 24 so that when pulled thereacross, the roller 24 reduces the drag which must be overcome when the cable 28 is drawn along the length of the tray 22. Since the cable trays installed within some buildings are relatively long, any reduction in the amount of drag which opposes the pulling of a cable along a tray can be desirable.

Figure 2:
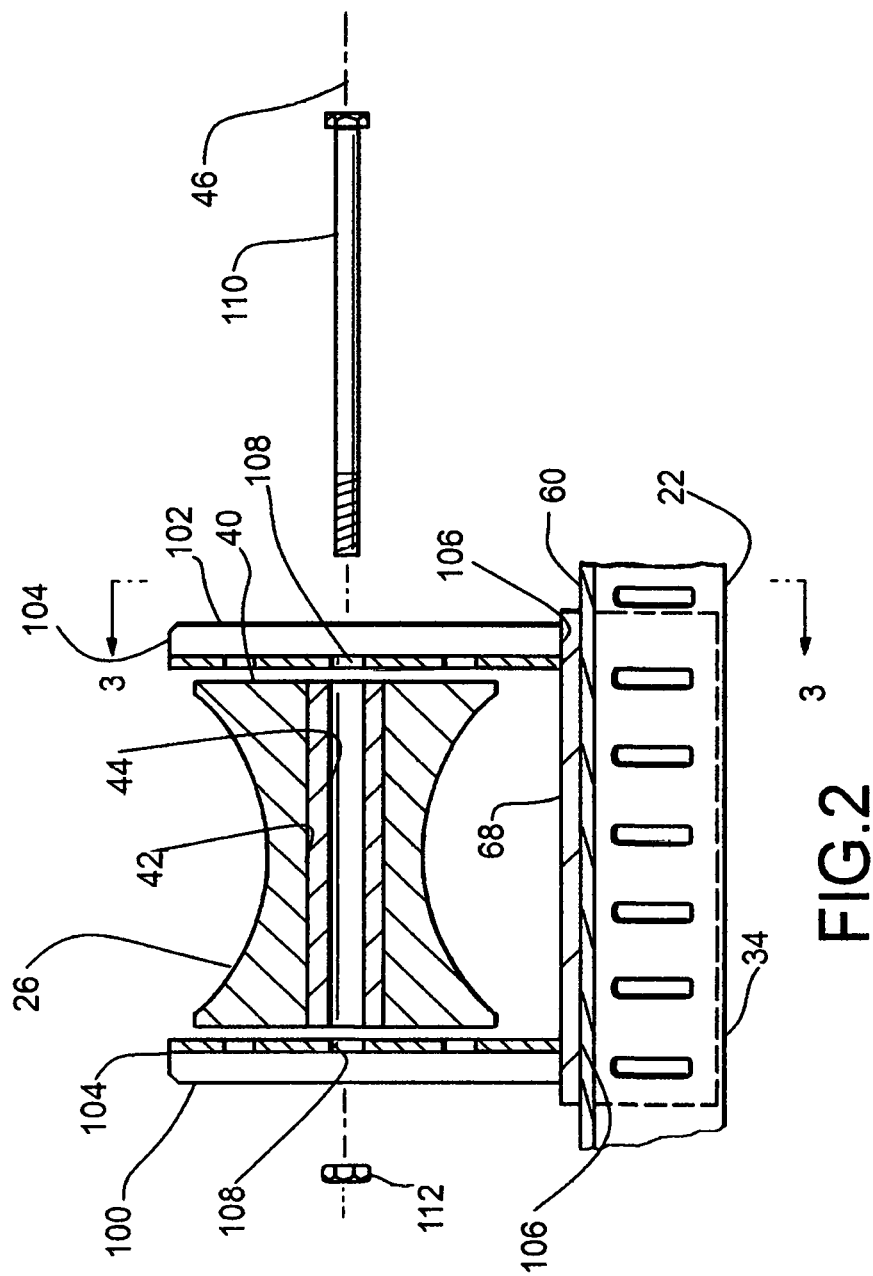
FIG. 2 is a longitudinal cross-sectional view of the FIG. 1 roller assembly.

The cable tray 22 of FIGS. 1 and 2 is exemplary of a class of cable trays with which the roller assembly 20 is securable for routing of the cable 28 along the length of the tray 22. More specifically, the tray 22 includes a pair of side rails 30, 32 which are arranged in a substantially parallel relationship with one another and extend along the length of the tray 22 and also includes a plurality of bars, or struts 34, which extend substantially transversely across the tray 22 and are arranged in spaced relationship with one another so that when assembled, the tray 22 resembles a ladder wherein the struts 34 provide the rungs of the ladder. Each strut 34 can be affixed at each end to the rails 30, 32 by any of a number of schemes, such as with welds or J-bolts, and is commonly provided with a series of through-openings 50 disposed therealong. In addition, the tray 22 can have any number of straight sections, curved sections or changes in elevation (i.e. vertically-disposed sections or sections which are sloped with respect to the horizontal) along the length thereof.

It will be understood, however, that the construction of the struts 34 of the tray 22 is not limited to any particular style. For example, one commonly-used framing system which is available from Alkore International, Inc. Of Harvey, Ill. under the trade designation UNISTRUT includes a channel of substantially U-shaped cross section which is well-suited for use as a strut 34 of the tray 22. In addition, the assignee of the present invention offers a product which is suitable for use as a strut 34 capable of being secured, as with J-bolts, to the side rails 30, 32 of the tray 22 and whose side openings are disposed therealong so as to be capable of being aligned with preformed openings provided in the sides of an attachment portion (described herein) associated with the roller assembly 20. Accordingly, the strut 34 of the exemplary tray 22 can possess any of a number of construction styles.

Figure 3:
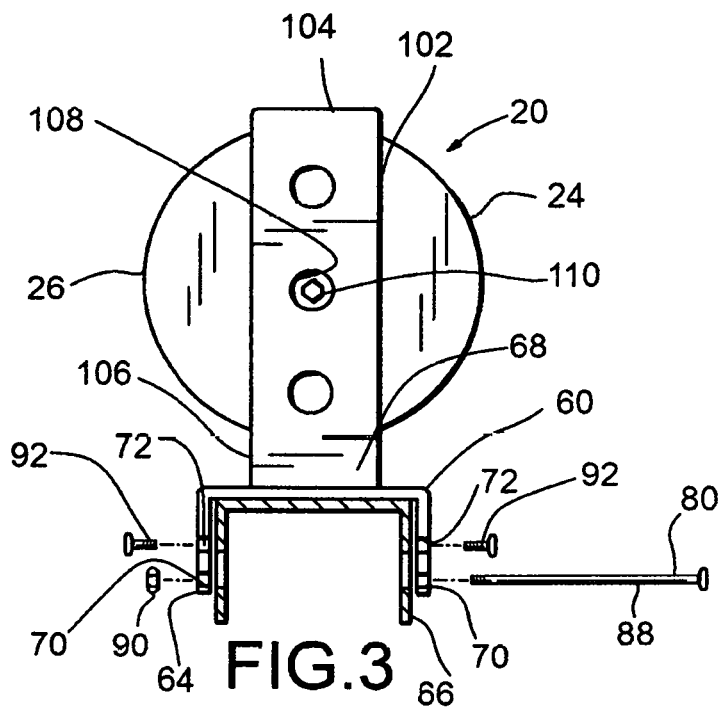
FIG. 3 is a side view of the FIG. 1 roller assembly as viewed along lines 3-3 of FIG. 2.

With reference to FIGS. 1-3, the roller 24 of the depicted roller assembly 20 includes a body 40 having a central bore 42 within which an internal bearing 44 is secured to facilitate the rotation of the roller 24 about a rotational axis 46. In addition and when viewed in the longitudinal cross-sectional view of FIG. 2, the peripheral surface 26 of the roller 24 is substantially U-shaped so that the peripheral surface 26 is closest to the rotational axis 46 at locations disposed about midway between its ends. As a cable 28 is drawn across, for example, the upper surface of, the roller 24, the U-shaped cross section of the peripheral surface 26 provides a guideway within with a cable 28 normally remains centered between the opposite ends of the roller 24. The body 40 of the depicted roller 24 can be constructed of any of a number of materials, such as hard plastic.

The roller assembly 20 also includes an elongated channel, or attachment, portion 60 having a longitudinal axis 62 and a cross sectional shape (best shown in FIG. 3) which is substantially U-shaped in form. The U-shaped cross section of the attachment portion 60 includes a pair of substantially parallel legs 64, 66 and a base 68 which extends between the two legs 64, 66. For purposes of securement of the assembly 24 to a strut 34, each leg 64, 66 of the attachment portion 60 includes a plurality of (i.e. two) sets of through-openings 70, 72, 74 adapted to accept the shanks of fasteners directed therethough. In addition, the attachment portion 60 is positionable about the transversely-extending strut 34 of the cable tray 22 by directing the opening of the U of the cross-sectional shape of the attachment portion 60 downwardly, as viewed in FIG. 3, over the strut 34 so that the strut 34 is accepted by the U of the cross-sectional shape of the attachment portion 60. Thus, the cross-sectional shape of the attachment portion 60 enables the roller assembly 20 to be readily dropped into place over a strut 34 of the cable tray 22.

The roller 24 is mounted upon the attachment portion 60 by way of a pair of post members 100, 102 each having two opposite ends 104, 106 (i.e. upper and lower ends, respectively, as viewed in FIGS. 1-3) and wherein each post member 100 or 102 is affixed (e.g. welded) at one end 106 to the base 68 of the attachment portion 60 so that the opposite end 106 extends from the surface of the base 68 in a direction opposite the direction in which the legs 64, 66 extend. In addition, each post member 100 or 102 includes a substantially centrally-disposed through-opening 108 which is aligned with the through-opening 108 of the other post member 102 or 100, and the assembly 20 further includes a threaded bolt 110 (FIG. 2) which is adapted to be secured through both the aligned through-openings 108 and the central bore 42 of the body 40 of the roller 24 to rotatably mount the roller 24 upon the attachment portion 60. In other words, by positioning the body 40 of the roller 24 between the post members 100, 102 so that the bore 42 of the roller body 40 is aligned with the through-openings 108 of the post members 100, 102, and then directing the bolt 110 shank end-first through the aligned central bore 42 and the through-openings 108, the roller 24 is free to rotate about the shank of the bolt 110 by way of the internal bearing 44. A nut 112 (FIG. 2) can be threadably positioned about the end of the bolt 110 opposite the head thereof to secure the roller 24 between the post members 100, 102.

For securement of the roller assembly 20 in place about the strut 34, any of a number of styles of fasteners, generally indicated 80 in FIG. 1, can be used. For example and in the event that one of a set of through-openings 70, 72 or 74 are aligned with corresponding through-opening 50 provided along the length of the strut 34, the fasteners 80 can take the form of a headed bolt 88 having a shank which can be inserted shank end-first through the aligned through-openings provided in both the attachment portion 60 and the strut 34 and secured therethrough with a nut 90 so that the attachment portion 60 is pinned to the strut 34 by way of the shank of the bolt 88. Similarly and in the event that one of a set of through-openings 70, 72 or 74 is disposed beneath the lowermost (as viewed in FIGS. 1-3) edges of the strut 34, the shank of a headed bolt 88 can be inserted through the set of through-openings 70, 72 or 74 and secured therethrough by way of the nut 90 so that the strut 34 is captured between the (underside of) the base 68 of the attachment portion 60 and the shank of the bolt 88.

In the alternative and if any of the through-openings 70, 72 or 74 is internally-threaded and is backed by an exposed surface of the strut 34 (e.g. an outer surface of the leg 64 or 66 of the connector portion 60), a headed bolt 92 (FIG. 3) can be threaded within the internally-threaded through-opening 70, 72 or 74 and tightened against the exposed strut surface so that the headed bolt 92 acts as a set screw for securing the attachment portion 60 to the strut 34. A similar purpose can be served by providing a preformed opening in one leg 64 or 66 of the connector portion 60 and then securing (as with a weld) an internally-threaded nut (not shown) to the one leg 64 or 66 about the preformed opening. In this instance, the internal threads of the secured nut are thereby in condition for threadably accepting the shank of a headed bolt which, when threadably accepted by the secured nut and thereafter tightened against a surface of the strut 34, acts as a set screw for securing the attachment portion 60 to the strut 34.

It follows from the foregoing that the channel-shaped attachment portion 60 provides a convenient means by which the roller assembly 20 can readily be positioned in place upon the strut 34 and secured thereto with the fasteners 80. By comparison, the roller assembly 20 can be readily removed from the strut 34 by removing the fasteners 80 from the aligned sets of through-openings 70, 72 or 74 and simply lifting the attachment portion 60 from the strut 34.

Figure 4:
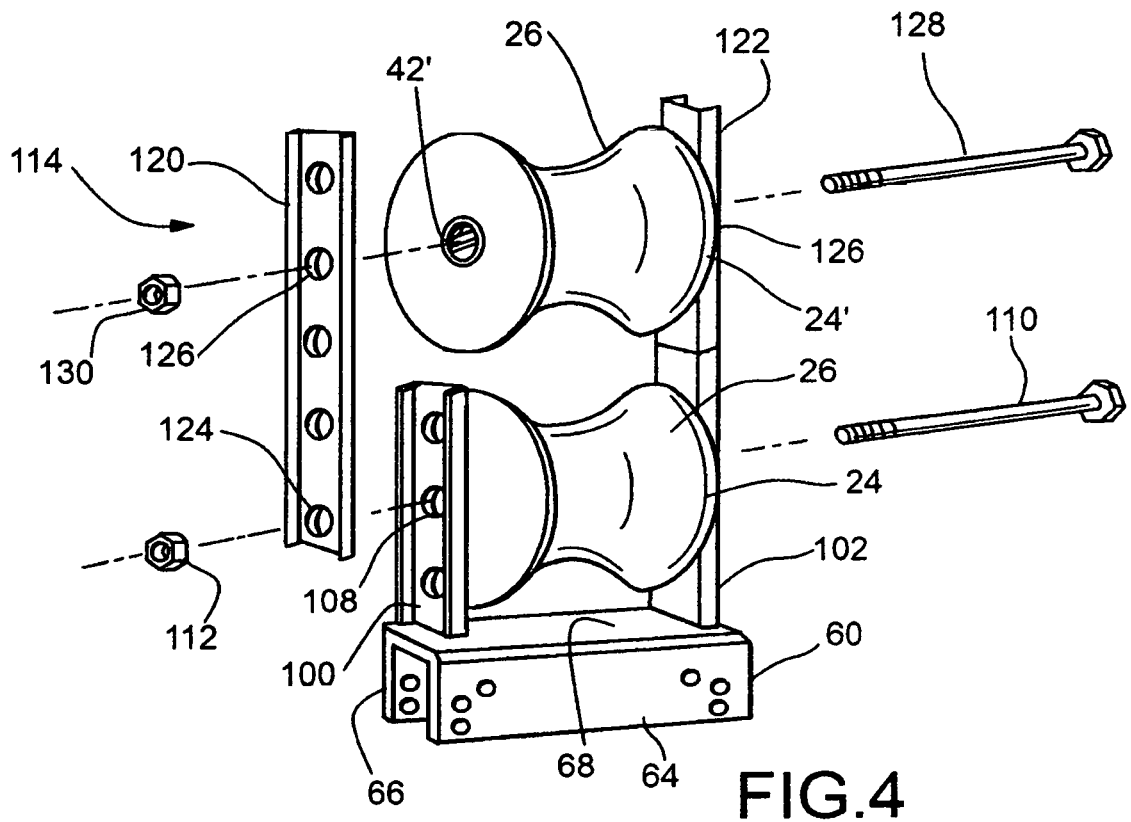
FIG. 4 is a perspective view of an alternative embodiment of a roller assembly within which features of the present invention are incorporated, shown exploded.

With reference to FIG. 4 and if it is desired to construct a roller assembly, generally indicated 114 in FIG. 4, which includes a plurality of rollers 24, 24' arranged in a stacked relationship with one another, another pair of post members 120, 122 having a plurality of bolt-accepting through-openings 124, 126 can be secured to the roller assembly 20 by way of the bolt 110 (and nut 114), and another roller 24' of identical construction to that of the aforedescribed roller 24 can be secured to the post members 120, 122 by way of a bolt 128 (and nut 130). In other words, by removing the bolt 110 from the roller assembly 20, positioning each of the additional post members 120, 122 against the post members 100, 102 so that the through-openings 124 of the additional post members 120, 122 are aligned with the through-openings 108 and the bore 42 (FIG. 2) of the roller body 40 and so that the opposite ends (i.e. the upper ends as viewed in FIG. 4) of the additional post members 120, 122 extend upwardly from the post members 100, 102, and then re-securing the bolt 110 in place through the through-openings 124, 108 and bore 42, the additional post members 120, 122 are thereby secured to the post members 100, 102.

The additional roller 24' can then be positioned between the upwardly-extending (as viewed in FIG. 4) ends of the post members 120, 122 so that the central bore 42' thereof is aligned with the through-openings 126 of the post members 120, 122. At that point, the bolt 128 can be inserted shank end-first through the aligned through-openings 126 and the bore 42' of the roller 24', and the nut 130 can be threadably positioned upon the shank end of the bolt 128 to thereby rotatably secure the roller 24' in a superposed relationship with the roller 24. The resulting stacked relationship of rollers 24, 24' provides a substantially enclosed passageway, indicated 132 in FIG. 4, between the peripheral surfaces 26, 26 of the rollers 24, 24' through which a cable 28 can be drawn and is thus well-suited for use along a section of a cable tray immediately preceding or following a change in elevation of the cable tray provided, for example, by a vertical or sloped section of the tray. In addition, the stacked arrangement of rollers 24, 24' provided by this roller assembly 114 could also be advantageously used in an application in which one cable is desired to be pulled or drawn across the peripheral surface 26 of one roller 24 while another cable is desired to be pulled or drawn across the peripheral surface 26 of the other roller 24'.

It is also a feature of the roller assembly 114 of FIG. 4 that its sets of post members 100, 102 and 120, 122 are adapted to cooperatively interlock with one another at the opposite ends of the rollers 24, 24' to prevent movement of the post members 100, 120 and 102, 122 relative to one another. To this end, each post member 100, 102, 120 or 122 has a cross-sectional shape which resembles a U-shaped channel, and the opening of the U of the U-shaped channel of each post member is adapted to closely accept the U-shaped channel of a corresponding post member. In particular, by positioning the post member 120 along the length of the post member 100 so that the U-shaped channels thereof are arranged in a nested relationship (i.e. at which the U-shaped channel of one post member 120 is closely accepted by the U-shaped channel of the other post member 100), the post members 100, 120 are prevented from moving (or rotating) relative to one another upon securement of the bolt 110 through aligned openings thereof. Similarly, by positioning the post member 122 along the length of the post member 102 so that the U-shaped channels thereof are arranged in a nested relationship, the post members 102, 122 are prevented from moving (or rotating) relative to one another upon securement of the bolt 110 through aligned openings thereof.

Figure 5:
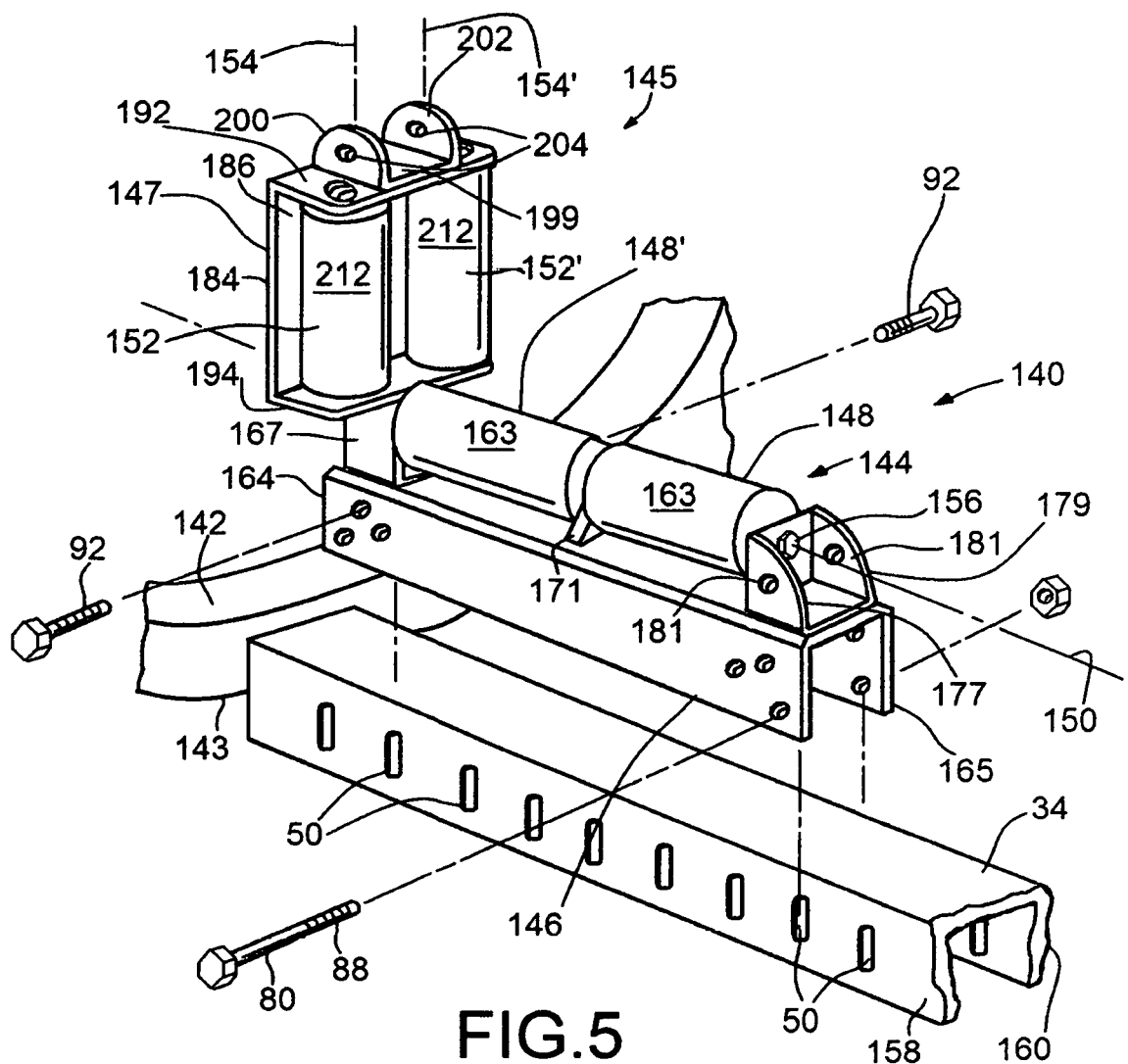
FIG. 5 is a perspective view of another embodiment of a roller assembly within which features of the present invention are incorporated and a fragment of a curved cable tray upon which this roller assembly embodiment is secured.

With reference to FIGS. 5 and 6, there is depicted another embodiment, generally indicated 140, of a roller assembly within which features of the invention are embodied and a cable tray 142 or, more specifically, a cable tray strut 34, to which the roller assembly 140 is securable. Briefly, the roller assembly 140 includes a first arrangement 144 of rollers which are rotatably mounted upon a first attachment portion 146 wherein the roller arrangement 144 includes at least one roller 148 which is rotatably mounted upon the attachment portion 146 for rotation about a rotation axis 150 which is disposed substantially parallel to the longitudinal axis of the strut 34. Meanwhile, the roller assembly 140 includes a second arrangement 145 of rollers including at least one roller 152 which is rotatably attached to a second attachment portion 147 for rotation about a rotation axis (e.g. an axis 154) which is disposed substantially normal to the longitudinal axis of the strut 34. Consequently, the rotational axis 150 of the first arrangement 144 of rollers And that of the at least one roller 152 are substantially normal to one another. As will be apparent herein, the first and second roller arrangements 144, 145 are well-suited for use along the length of the cable tray 142 at which a corner, or turn, in the tray 142 is present.

Within the depicted embodiment 140, the first attachment portion 146 is channel-shaped in form (like that of the attachment portion 60 of the roller assembly 20 of FIGS. 1-3) so as to provide the attachment portion 146 with a substantially U-shaped cross section having a pair of legs 158, 160 arranged in a substantially parallel relationship with one another and a base 162 which extends between the legs 158, 160. Furthermore and as is the case with the attachment portion 60 of the roller assembly 20 of FIGS. 1-3, each leg 158 or 160 of the first attachment portion 142 of the roller assembly 140 defines a plurality of (e.g. two) sets of through-openings 82, 84, 86 which can be used with fasteners 80 (e.g. fasteners 88 or 72 of FIG. 5) for securing the roller assembly 140 upon the strut 34.

Meanwhile, the first arrangement 144 of rollers includes a pair of rollers 148, 148' which are arranged in an end-to-end relationship upon the base 162 of the first attachment portion 146 and are rotatably mounted thereupon by way of an arrangement of mounting brackets 167, 171 and 175 (best shown in FIG. 6) and a lengthy pin, or headed bolt 156. Each roller 148 or 148' includes a body 157 having a central bore 159 or 159', respectively, an internal bearing 161 mounted within the central bore 159, and an outer (e.g. cylindrically-shaped) peripheral surface 163. As will be apparent herein, the peripheral surfaces 163 of the rollers 148, 148' collectively provide a relatively lengthy surface along which a cable (or cables) can be drawn.

As best shown in FIG. 6, the first attachment portion 146 includes two opposite ends 164, 165 and one mounting bracket 167 (which is substantially box-shaped in form) is secured (e.g. welded) upon the base 162 adjacent one end 164 of the attachment portion 146. In addition, the bracket 167 includes a pair of opposing sidewalls within which a bolt-accepting through-opening 169 is defined. Meanwhile, a second mounting bracket 171 (which is triangular in form) is secured (e.g. welded) along one of its sides upon the base 162 at a location disposed substantially midway along the length of the attachment portion 14 and defines a centrally-disposed, bolt-accepting through-opening 173. The third mounting bracket 175 (whose sides somewhat resemble a three-sided box) is secured (e.g. welded) upon the base 162 adjacent the other end 165 of the attachment portion 146, and two of its sides form a pair of parallel flanges 177, 179 which are arranged substantially normal to the plane of the base 162 and through which a set of through-openings 181 are defined. In addition, another side of the bracket 175 defines a centrally-disposed bolt-accepting through-opening 183.

In order to mount the rollers 148, 148' upon the first attachment portion 148, one roller 148 is positioned between the first and second mounting brackets 167, 171 so that its central bore 159 is aligned with the bolt-accepting openings 169, 173, the other roller 148' is positioned between the second and third mounting brackets 171, 175 so that the central bore 159' thereof is aligned with the bolt-accepting openings 173, 183 of the second and third mounting brackets 171, 175, and then the lengthy bolt 156 is directed in sequence through the opening 183 of the third mounting bracket 175, the central bore 159 of the roller 148, the opening 173 of the second mounting bracket 171, the central bore 159' of the roller 148', and then through the opening 169 of the first mounting bracket 167, and is then secured through these aligned openings with a nut 136.

With reference still to FIGS. 5 and 6, the second arrangement 145 of rollers includes a pair of rollers 152, 152' which are rotatably mounted upon the second attachment portion 147 in a side-by-side relationship with one another and so that the rotational axes 154, 154' thereof are substantially parallel to one another. To this end, the second attachment portion 147 includes a substantially U-shaped bracket 184 having a planar base portion 186 having two opposite ends 188, 190 and a pair of end plates 192, 194 which are mounted at the opposite ends 188, 190 of the planar base portion 186 so as to extend to one side thereof. Two sets of through-openings 196, 196' are defined through the end plates 192, 194 for mounting the rollers 152, 152' to the bracket 184. The bracket 184 is, in turn, mounted the first attachment portion 142 adjacent the end 164 thereof. To this end, the end plate 194 is joined (e.g. welded) to the first mounting bracket 167 so that the U of the U-shaped opening of the bracket 184 opens in a direction which is substantially parallel to the rotational axis 150 of the second arrangement 144 of rollers 148, 148'.

Furthermore, a mounting bracket 199 including a pair of flanges 200, 202 is attached to the end plate 192 of the bracket 184 so as to be disposed outboard of the U of the U-shaped bracket 184. Aligned through-openings 204 are defined in the flanges 200, 202, and the spaced distance between the flanges 200, 202 of the mounting bracket 199 is slightly smaller than the distance between the flanges 177, 179 of the mounting bracket 175 to accommodate the attachment of the entire roller assembly 140 to a roller assembly 140' (FIG. 7) of identical construction, as will be apparent herein.

With reference again to FIG. 6, each roller 152 or 152' includes a body 208 having a central bore 210 or 210', an internal bearing 212 mounted within the central bore 210, and an outer (e.g. cylindrically-shaped) peripheral surface 212. In order to mount the rollers 152, 152' within the bracket 184, each roller 152 or 152' is positioned between the end plates 192, 194 of the bracket 184 so that the central bores 210, 210' of the rollers 152, 152' are aligned with a corresponding set of through-openings 196 or 196', and bolts 214 are directed shank end-first through the aligned through-openings 196 or 196' and through the central bore 210 or 210' of the roller 152 or 152'. Each roller 152 or 152' is then secured in place with nuts 216 which are threadably secured upon the bolts 214 so that the end plates 192, 194 are captured between the heads of the bolts 214 and the nuts 216.

With the rollers 152, 152' (or more specifically, the rotational axes 154, 154' thereof) arranged in a substantially normal relationship to the longitudinal axis 150 of the rollers 148, 148' of the first arrangement 144 of rollers, the peripheral surfaces 212 of the rollers 152, 152' and the peripheral surfaces 160 of the rollers 148, 148' provide somewhat of an L-shaped arrangement of surfaces (as viewed generally from the left in FIG. 5) across which a cable can be drawn during a cable-drawing operation. Such an L-shaped surface arrangement is particularly well-suited for positioning at a curve or corner of a cable tray, as is depicted by the arcuate-shaped side rail, indicated 143 in FIG. 5, wherein the peripheral surfaces 212, 212 of the rollers 152, 152' are disposed along the inside (so as to face outwardly) of the curve defined along the tray 142. More specifically and when a cable is pulled through a corner of the cable tray 142 at which the roller assembly 140 is mounted, the peripheral surfaces 163, 163 of the rollers 148, 148' provide a (e.g. generally horizontally-disposed) surface upon which the cable can rest in the event that the cable experiences slackness at the corner, and the peripheral surfaces 212, 212 of the rollers 152, 152' provide (e.g. generally vertically-disposed) surfaces against which the cable can bear if the cable experiences tautness as it moves through the curve.

With reference to FIG. 7, there is illustrated a roller assembly, generally indicated 220, which provides an enclosed, rectangular-shaped passageway, or throughway 222, whose sides are provided by the peripheral surfaces of a plurality of cylindrical rollers. In this connection, the roller assembly 220 includes one roller assembly 140 (of FIGS. 5 and 6) and another roller assembly 140' which is identical in construction to the roller assembly 140. Accordingly, components of the roller assembly 140' of FIG. 7 which are identical to those of the roller assembly 140 of FIGS. 5 and 6 bear the same reference numerals.

Within the roller assembly 220 of FIG. 7, the roller assembly 140' is arranged in an inverted relationship with respect to the roller assembly 140 and so that the brackets 199 and 175 of the roller assembly 140 are arranged in mating relationship with the brackets 175 and 199, respectively, of the roller assembly 140'. That is to say—and with reference to FIGS. 7a and 7b, the brackets 199, 175 of the roller assemblies 140, 140' are arranged so that the through-openings 204 of each bracket 199 are aligned with the through-openings 181 of a corresponding bracket 175 of the other roller assembly 140 or 140'. The roller assemblies 140, 140' are then secured together with bolts 224 (and cooperating nuts 226) which extend through the aligned through-openings of the brackets 199 and 175.

Figure 8:
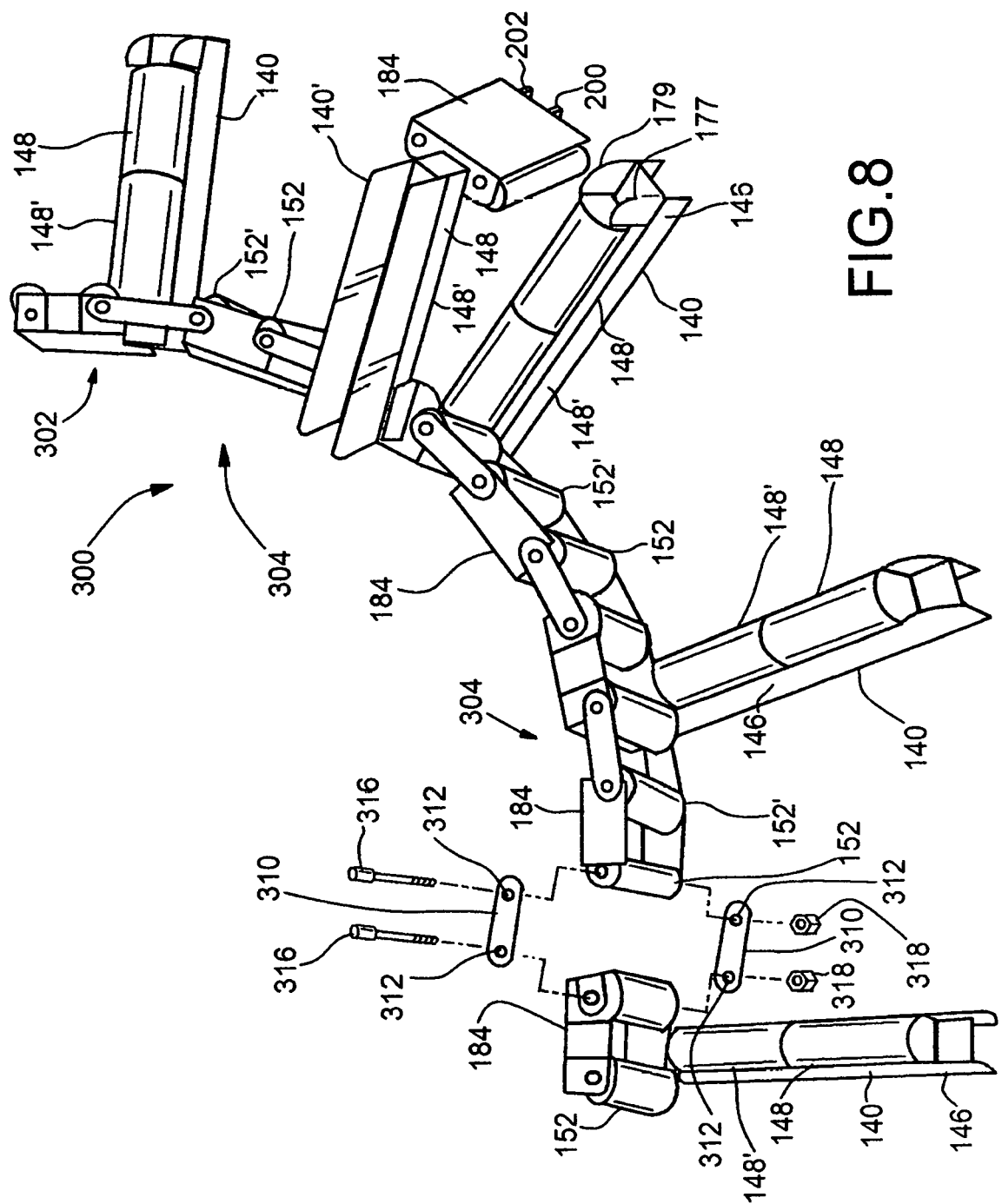
FIG. 8 is a perspective view of yet another embodiment of a roller assembly within which features of the present invention are incorporated, shown exploded.

As a demonstration of the versatility of the aforedescribed roller assembly 140 of FIGS. 5 and 6 or, more particularly, of the components thereof, reference can be had to FIG. 8 wherein an embodiment, generally indicated 300, of a roller apparatus is illustrated which includes principal components of the earlier-described roller assembly 140 of FIGS. 5 and 6 and which is well-suited for use during the pulling of a cable through a cable tray. The roller apparatus 300 includes a plurality of roller assemblies 140 (of FIGS. 5 and 6) whose attachment portions 146 are spaced to be positionable over (and thus securable to) a corresponding strut (not shown) provided along the length of the tray. There are also provided along the length of the chain arrangement of the depicted roller apparatus 300 a plurality of roller arrangements, generally indicated 304, wherein each roller arrangement 304 is comprised of the assemblage of the second arrangement 145 of rollers 148' and the second attachment portion 147 of the roller assembly 140. Accordingly, the components of the roller apparatus 300 which are identical to those of the roller assembly 140 (or to the components thereof) bear the same reference numerals.

Within the chain arrangement 302 of the roller apparatus 300, each roller arrangement 304 is disposed between adjacent pairs of roller assemblies 140 present along the length of the chain arrangement 302. In order to join the roller arrangements 304 to the adjacent roller assemblies 140, there is provided a pair of plates 310 having two opposite ends and wherein a bolt-accepting opening 312 is defined at each of the opposite ends of the plates 310. The plates 310 can be secured, or pinned, to a corresponding roller arrangement 304 or roller assembly 140 by aligning an opening 312 with a corresponding central bore 210 or 210' of a roller 152 or 152' and utilizing a bolt 316 (and cooperating nut 318) to secure the plates 310 between the roller arrangement 304 and the adjacent roller assembly 140.

In addition, the roller apparatus 300 further includes an additional roller assembly 140' which is joined to one of the roller assemblies 140 (in the identical manner in which the roller assembly 140 is joined to the roller assembly 140 in FIG. 7 to provide the apparatus 300 with a substantially enclosed, multi-sided passageway through which a cable can be routed. To this end, the roller assembly 148' is disposed in an inverted relationship with one of the roller assemblies 140, and the roller arrangement of the roller assembly 140 is joinable to the roller arrangement of the roller assembly 140 by way of the mateable sets of flanges 177, 179 and 200, 202 disposed at the end 165 of the attachment portion 146 or at one end of the U-shaped bracket 184.

To use the roller apparatus 300, the roller apparatus 300 is preferably positioned within a cable tray at a location therealong at which a corner is present and so that the chain arrangement of the roller apparatus 300 is disposed along the inside of the corner. With the roller apparatus 300 thus arranged at a corner of the cable tray, the peripheral surfaces of the rollers 152, 152' are in position to provide vertically-disposed surfaces against which the cable can bear when the cable is pulled taut through the corner and the peripheral surfaces of the rollers 148, 148' provide upwardly-directed surfaces against which the cable can rest if the cable experiences slackness at the corner. Meanwhile, the assembled arrangement of the apparatus 300 comprised of a roller assembly 140 and roller assembly 140' provides an enclosed, rectangular-shaped passageway through which a cable can be drawn during a cable-pulling operation.

It will be understood from the foregoing that a roller assembly has been described having rollers whose peripheral surfaces provide surfaces against which a cable can bear during a cable-drawing operation involving the installation of a cable along a cable tray having at least one transversely-extending strut. Each of the roller assembly embodiments described herein incorporates an elongated attachment portion for securement of the embodiment to a transversely-extending strut of a cable tray, and some of the embodiments described herein include a bracket to which additional rollers are mounted. It will also be understood that in some instances, the construction of the assembly embodiments accommodate the securement thereto of roller assemblies of like construction to provide multi-sided, or even substantially enclosed, passageways through which a cable can be routed during a cable-drawing operation. Such multi-sided or substantially enclosed passageways are well-suited for use along a curve or corner of a cable tray or along a section of a cable tray at which the elevation of the tray is altered.

It will be understood that numerous modifications and substitutions can be had to the aforedescribed embodiments without departing from the spirit of the invention. Accordingly, the aforedescribed embodiments are intended for the purpose of illustration and not as limitation.

The invention claimed is:

1. A roller assembly for facilitating the drawing of a cable along a cable tray wherein the cable tray with which the roller assembly is used includes at least one transversely-extending strut having a longitudinal axis and an elongated support surface which is entirely planar in form, oriented substantially parallel to the longitudinal axis of the strut and against which the roller assembly is positionable and wherein the elongated support surface has a length and a width, the assembly comprising:

a roller having a peripheral surface which is capable of being engaged by a cable drawn across the roller and wherein the roller is elongated in shape and has two opposite ends;

an elongated attachment portion having a longitudinal axis and a length as measured along the longitudinal axis of the elongated attachment portion and a cross-sectional shape which is substantially U-shaped in form having a pair of substantially parallel legs and a substantially planar base which extends between the two legs and lies in a plane which is substantially normal to the legs of the attachment portion and wherein the attachment portion is positionable about a transversely-extending strut of the cable tray by directing the opening of the U of the cross-sectional shape of the attachment portion over the strut so that the base of the attachment portion engages the elongated support surface of the strut along substantially the entire length of the attachment portion and across substantially the entire width of the support surface, and wherein one leg of the elongated attachment portion defines a pair of openings therein;

means for attaching the roller to the attachment portion to permit the roller to rotate about a rotation axis with respect to the attachment portion wherein the rotation axis of the roller extends through the two opposite ends of the roller and is substantially parallel to the longitudinal axis of the elongated attachment portion, wherein the means for attaching includes a pair of posts which are mounted upon the base of the attachment portion and are disposed at opposite ends of the roller so that the roller is positioned between the posts of the pair of posts, and wherein the pair of posts are confined between a pair of imaginary parallel planes which are arranged normal to the longitudinal axis of the attachment portion so that no portion of the posts is positioned outboard of the pair of parallel planes; and wherein each post of the pair of posts has an outer surface which lies in a corresponding one of the pair of imaginary parallel planes; and wherein the pair of openings defined within the one leg of the elongated attachment portion are disposed inboard of the pair of parallel planes; and a pair of fasteners for binding the attachment portion to the transversely-extending strut when the strut is accepted by the U of the cross-sectional shape of the attachment portion wherein each fastener has a shank which extends through a corresponding one of the pair of openings defined in the one leg of the attachment portion to thereby secure the attachment portion to the transversely-extending strut at locations disposed inboard of the pair of parallel planes and to prevent any lengthwise movement of the attachment portion along the strut; and wherein the elongated attachment portion has outboard-disposed portions which extend along the length of the attachment portion for engaging the transversely-extending strut when the attachment portion is secured thereto and which are disposed outboard of the opposite ends of the roller wherein one of the outboard-disposed portions is disposed adjacent one of the two opposite ends of the roller and another of the outboard-disposed portions is disposed adjacent the other of the two opposite ends of the roller so that when the attachment portion is secured to the transversely-extending strut with the pair of fasteners and the pair of openings as aforesaid, the attachment portion is secured to the transversely-extending strut at locations therealong which are inboard of the pair of parallel planes, the transversely-extending strut is engaged by the outboard-disposed portions, and the stability of the roller assembly about the strut is enhanced; and wherein the roller is a first roller and is adapted to rotate relative to the attachment portion about a first rotation axis and the roller assembly includes a second roller which is mounted upon the attachment portion for rotation with respect thereto about a second rotation axis, and the first and second rollers are arranged so that the first and second rotation axes are substantially parallel to one another.

2. The roller assembly as defined in claim 1 wherein the peripheral surface of at least one of the first or second roller is substantially cylindrical in shape.

3. A roller assembly for facilitating the drawing of a cable along a cable tray wherein the cable tray with which the roller assembly is used includes at least one transversely-extending strut having a longitudinal axis and an elongated support surface which is entirely planar in form, oriented substantially parallel to the longitudinal axis of the strut and against which the roller assembly is positionable and wherein the support surface has a width, the assembly comprising:

at least one roller having a peripheral surface which is capable of being engaged by a cable drawn across the at least one roller and wherein the at least one roller is elongated in shape and has two opposite ends;

an elongated attachment portion having a longitudinal axis, a length as measured along the longitudinal axis of the elongated attachment portion, opposite first and second ends and a cross sectional shape which is U-shaped in form having a pair of substantially parallel legs and a substantially planar base which extends between the two legs and lies in a plane which is substantially normal to the legs of the attachment portion and wherein the attachment portion is positionable about a transversely-extending strut of the cable tray by directing the opening of the U of the cross-sectional shape of the attachment portion over the strut so that the strut is accepted by the U of the cross-sectional shape of the attachment portion and so that the base of the attachment portion engages the elongated support surface of the strut along substantially the entire length of the attachment portion and across substantially the entire width of the support surface, and wherein one leg of the pair of parallel legs defines a pair of openings therein which communicate with the interior of the U of the U-shaped cross-sectional shape of the attachment portion;

means for attaching the at least one roller to the attachment portion for rotation with respect thereto about a rotation axis which is substantially parallel to the longitudinal axis of the attachment portion and extends through the two opposite ends of the at least one roller, wherein the means for attaching includes a pair of posts which are mounted upon the base of the attachment portion and are disposed at opposite ends of the at least one roller so that the at least one roller is positioned between the posts of the pair of posts, and wherein the pair of posts are confined between a pair of imaginary parallel planes which are arranged normal to the longitudinal axis of the attachment portion so that no portion of the posts is positioned outboard of the pair of parallel planes; and wherein each post of the pair of posts has an outer surface which lies in a corresponding one of the pair of imaginary parallel planes; and wherein the pair of openings defined within the one leg of the elongated attachment portion are disposed inboard of the pair of parallel planes; and a pair of fasteners wherein each fastener in the pair of fasteners has a shank which extends through a corresponding opening defined in the one leg of the attachment portion to thereby secure the attachment portion to the transversely-extending strut at locations therealong which are disposed inboard of the pair of parallel planes and to prevent any lengthwise movement of the attachment portion along the strut; and wherein the elongated attachment portion has outboard-disposed portions which extend along the length of the attachment portions for engaging the transversely-extending strut when the attachment portion is secured thereto and which are disposed outboard of the opposite ends of the at least one roller wherein one of the outboard-disposed portions is disposed adjacent one of the opposite ends of the at least one roller and another of the outboard-disposed portions is disposed adjacent the other of the two opposite ends of the at least one roller so that when the attachment portion is secured to the transversely-extending strut and the transversely-extending strut is engaged by the outboard-disposed portions, the stability of the roller assembly about the strut is enhanced; and wherein the at least one roller of the roller assembly includes:

a first roller which is attached to the attachment portion for rotation about a first axis; and a second roller which is attached to the attachment portion for rotation about a second axis, and the first and second rotation axes are arranged in a substantially parallel relationship.

4. In combination:

a cable tray having at least one transversely-extending strut having a longitudinal axis, two opposite sides and an elongated support surface which extends between the two opposite sides of the strut; and a roller assembly for facilitating the drawing of a cable along the cable tray wherein the roller assembly includes a first roller arrangement including at least one roller having a peripheral surface which is capable of being engaged by a cable drawn across the at least one roller and wherein the at least one roller is elongated in shape and has two opposite ends;

an elongated attachment portion having a longitudinal axis, a length as measured along the longitudinal axis of the elongated attachment portion, opposite first and second ends and a cross sectional shape which is U-shaped in form having a pair of substantially parallel legs and a base which extends between the two legs and wherein the attachment portion is positionable about a transversely-extending strut of the cable tray by directing the opening of the U of the cross-sectional shape of the attachment portion over the strut so that the strut is accepted by the U of the cross-sectional shape of the attachment portion and so that the base of the attachment portion engages the elongated support surface of the strut along substantially the entire length of the attachment portion, and wherein one leg of the substantially parallel legs defines a pair of openings therein;

a pair of fasteners for binding the attachment portion to the transversely-extending strut when the strut is accepted by the U of the cross-sectional shape of the attachment portion wherein each fastener has a shank which extends through a corresponding one of the pair of openings defined in the one leg of the attachment portion to thereby secure the attachment portion to the transversely-extending strut and to prevent any lengthwise movement of the attachment portion along the strut;

means for attaching the at least one roller to the attachment portion for rotation with respect thereto about a first rotation axis wherein the first rotation axis is substantially parallel to the longitudinal axis of the transversely-extending strut when the attachment portion is positioned about the transversely-extending strut as aforesaid and wherein the first rotation axis extends through the two opposite ends of the at least one roller, wherein the means for attaching includes a pair of posts which are mounted upon the base of the attachment portion and are disposed at opposite ends of the at least one roller so that the at least one roller is positioned between the posts of the pair of posts, and wherein the pair of posts are confined between a pair of imaginary parallel planes which are arranged normal to the longitudinal axis of the attachment portion so that no portion of the posts is positioned outboard of the pair of parallel planes; and wherein each post of the pair of posts has an outer surface which lies in a corresponding one of the pair of imaginary parallel planes; and wherein the pair of openings defined within the one leg of the elongated attachment portion are disposed inboard of the pair of parallel planes;

a second roller arrangement including two rollers which are arranged in a side-by-side relationship with one another wherein each of the two rollers of the second roller arrangement has a peripheral surface which is capable of being engaged by a cable drawn across the two rollers of the second roller arrangement;

a bracket for supporting the two rollers of the second roller arrangement for rotation about rotation axes which are substantially parallel to one another and which is fixedly secured to the attachment portion adjacent one end thereof so that the rotational axes of the two rollers of the second roller arrangement are substantially normal to the rotation axis of the at least one roller of the first arrangement of rollers; and wherein the elongated attachment portion has outboard-disposed portions which extend along the length of the attachment portion for engaging the transversely-extending strut when the attachment portion is secured thereto and which are disposed outboard of the opposite ends of the at least one roller wherein one of the outboard-disposed portions is situated adjacent one of the two opposite ends of the at least one roller and another of the outboard-disposed portions is situated adjacent the other of the two opposite ends of the at least one roller so that when the attachment portion is secured to the transversely-extending portion with the fasteners and openings as aforesaid, the attachment portion is secured to the strut at locations therealong which are disposed inboard of the pair of parallel planes, the transversely-extending strut is engaged by the outboard-disposed portions, and the stability of the roller assembly across the transversely-extending strut is enhanced.

5. The combination as defined in claim 4 wherein the peripheral surfaces of the at least one roller of the first roller arrangement and the two rollers of the second roller arrangement cooperate to provide a cable passageway having two sides wherein one side of the cable passageway is provided by the peripheral surface of the at least one roller of the first roller arrangement and the other side of the cable passageway is provided by the peripheral surfaces of the two rollers of the second roller arrangement.

6. A roller assembly for facilitating the drawing of a cable along a cable tray having at least one transversely-extending strut having a longitudinal axis and an elongated support surface which is oriented substantially parallel to the longitudinal axis of the strut and against which the roller assembly is positionable, the assembly comprising:

a first roller arrangement including one roller having a peripheral surface which is capable of being engaged by a cable drawn across the first roller arrangement and wherein the one roller is elongated in shape and has two opposite ends;

an elongated attachment portion having a longitudinal axis, a length as measured along the longitudinal axis of the elongated attachment portion, opposite first and second ends and a cross sectional shape which is U-shaped in form having a pair of substantially parallel legs and a base which extends between the two legs and wherein the attachment portion is positionable about a transversely-extending strut of the cable tray by directing the opening of the U of the cross-sectional shape of the attachment portion over the strut so that the strut is accepted by the U of the cross-sectional shape of the attachment portion and so that the base of the attachment portion engages the elongated support surface of the strut along substantially the entire length of the attachment portion, and wherein one leg of the pair of substantially parallel legs of the elongated attachment portion defines a pair of openings therein;

a pair of fasteners for binding the attachment portion to the transversely-extending strut when the strut is accepted by the U of the cross-sectional shape of the attachment portion wherein each fastener has a shank which extends through a corresponding one of the pair of openings defined in the one leg of the pair of substantially parallel legs of the attachment portion to thereby secure the attachment portion to the transversely-extending strut and to prevent any lengthwise movement of the attachment portion along the strut;

means for attaching the one roller of the first roller arrangement to the attachment portion for rotation with respect thereto about a first rotation axis wherein the first rotation axis is substantially parallel to the longitudinal axis of the transversely-extending strut when the attachment portion is positioned about the transversely-extending strut as aforesaid and wherein the rotation axis of the one roller extends through the opposite ends of the one roller of the first roller arrangement, wherein the means for attaching includes a pair of posts which are mounted upon the base of the attachment portion and are disposed at opposite ends of the one roller of the first roller arrangement so that the one roller of the first roller arrangement is positioned between the posts of the pair of posts, and wherein the pair of posts are confined between a pair of imaginary parallel planes which are arranged normal to the longitudinal axis of the attachment portion so that no portion of the posts is positioned outboard of the pair of parallel planes; and wherein each post of the pair of posts has an outer surface which lies in a corresponding one of the pair of imaginary parallel planes; and wherein the pair of openings defined within the one leg of the elongated attachment portion are disposed inboard of the pair of parallel planes;

a second roller arrangement including one roller having a peripheral surface which is capable of being engaged by a cable drawn across the second roller arrangement;

a bracket which is fixedly secured to the attachment portion adjacent one end thereof for supporting the one roller of the second roller arrangement for rotation about a rotation axis which is substantially normal to the first rotation axis about which the one roller of the first roller arrangement is adapted to rotate, and wherein the one roller of the first roller arrangement and the one roller of the second roller arrangement cooperate with one other so that the peripheral surfaces thereof collectively form a cable-accepting passageway having multiple sides against which a cable is capable of bearing when the cable is drawn along the passageway; and wherein the elongated attachment portion has outboard-disposed portions which extend along the length of the attachment portion for engaging the transversely-extending strut when the attachment portion is secured thereto and which are disposed outboard of the opposite ends of the one roller of the first roller arrangement wherein one of the outboard-disposed portions is situated adjacent one of the two opposite ends of the one roller of the first roller arrangement and another of the outboard-disposed portions is situated adjacent the other of the two opposite ends of the one roller of the first roller arrangement so that when the attachment portion is secured to the transversely-extending strut with the fasteners and openings as aforesaid and the transversely-extending strut is engaged by the out-board-disposed portions, the attachment portion is secured to the strut at locations therealong which are disposed inboard of the pair of parallel planes and the stability of the roller assembly about the transversely-extending strut is enhanced.

7. The roller assembly as defined in claim 6 wherein the cable-accepting passageway formed by the peripheral surfaces is shaped so that when the roller assembly is viewed along a path of intended movement of a cable being drawn through the cable-accepting passageway, the multiple sides of the cable-accepting passageway are contiguous with one another.

8. The roller assembly as defined in claim 6 wherein the cable-accepting passageway formed by the peripheral surfaces is shaped so that when the roller assembly is viewed along a path of intended movement of a cable being drawn through the cable-accepting passageway, the multiple sides of the cable-accepting passageway form an L wherein one leg of the L is defined by the peripheral surface of the one roller of the first roller arrangement and the other leg of the L is defined by the peripheral surface of the one roller of the second roller arrangement.

9. A roller assembly for facilitating the drawing of a cable along a cable tray wherein the cable tray with which the roller assembly is used includes at least one transversely-extending strut having a longitudinal axis and an elongated support surface which is entirely planar in form, oriented substantially parallel to the longitudinal axis of the strut and against which the roller assembly is positionable and wherein the elongated support surface has a length and a width, the assembly comprising:

a roller having a peripheral surface which is capable of being engaged by a cable drawn across the roller and wherein the roller is elongated in shape and has two opposite ends;

an elongated attachment portion having a longitudinal axis and a length as measured along the longitudinal axis of the elongated attachment portion and a cross-sectional shape which is substantially U-shaped in form having a pair of substantially parallel legs and a substantially planar base which extends between the two legs and lies in a plane which is substantially normal to the legs of the attachment portion and wherein the attachment portion is positionable about a transversely-extending strut of the cable tray by directing the opening of the U of the cross-sectional shape of the attachment portion over the strut so that the base of the attachment portion engages the elongated support surface of the strut along substantially the entire length of the attachment portion and across substantially the entire width of the support surface, and wherein one leg of the elongated attachment portion defines a pair of openings therein;

means for attaching the roller to the attachment portion to permit the roller to rotate about a rotation axis with respect to the attachment portion wherein the rotation axis of the roller extends through the two opposite ends of the roller and is substantially parallel to the longitudinal axis of the elongated attachment portion, wherein the means for attaching includes a pair of posts which are mounted upon the base of the attachment portion and are disposed at opposite ends of the roller so that the roller is positioned between the posts of the pair of posts, and wherein the pair of posts are confined between a pair of imaginary parallel planes which are arranged normal to the longitudinal axis of the attachment portion so that no portion of the posts is positioned outboard of the pair of parallel planes; and wherein each post of the pair of posts has an outer surface which lies in a corresponding one of the pair of imaginary parallel planes; and wherein the pair of openings defined within the one leg of the elongated attachment portion are disposed inboard of the pair of parallel planes; and a pair of fasteners for binding the attachment portion to the transversely-extending strut when the strut is accepted by the U of the cross-sectional shape of the attachment portion wherein each fastener has a shank which extends through a corresponding one of the pair of openings defined in the one leg of the attachment portion to thereby secure the attachment portion to the transversely-extending strut at locations disposed inboard of the pair of parallel planes and to prevent any lengthwise movement of the attachment portion along the strut; and wherein the elongated attachment portion has outboard-disposed portions which extend along the length of the attachment portion for engaging the transversely-extending strut when the attachment portion is secured thereto and which are disposed outboard of the opposite ends of the roller wherein one of the outboard-disposed portions is disposed adjacent one of the two opposite ends of the roller and another of the outboard-disposed portions is disposed adjacent the other of the two opposite ends of the roller so that when the attachment portion is secured to the transversely-extending strut with the pair of fasteners and the pair of openings as aforesaid, the attachment portion is secured to the transversely-extending strut at locations therealong which are inboard of the pair of parallel planes, the transversely-extending strut is engaged by the outboard-disposed portions, and the stability of the roller assembly about the strut is enhanced; and wherein the attachment portion has two opposite ends and the roller is a first roller which is adapted to rotate about a first rotational axis, and the roller assembly further includes a bracket which is mounted upon the attachment portion adjacent one of its two opposite ends and a second roller having a peripheral surface which is capable of being engaged by a cable drawn across the second roller and which is rotatably mounted upon the bracket for rotation with respect thereto about a second rotational axis; and the bracket is attached to the attachment portion so that the rotation axis of the second roller is arranged in a substantially normal relationship to the first rotation axis so that the peripheral surfaces of the first and second rollers collectively provide two sides of a multi-sided cable-accepting passageway through which a cable can be drawn.

10. The roller assembly as defined in claim 9 wherein the roller assembly is constructed to accommodate the joinder thereto of a second roller assembly of like construction to form a substantially enclosed, multi-sided passageway through which a cable can be drawn, wherein the second roller assembly of like construction includes a first roller and a second roller having peripheral surfaces capable of being engaged by a cable drawn across the first roller and the second roller.

11. The roller assembly as defined in claim 10 wherein the multi-sided passageway is substantially rectangular in form and the peripheral surfaces of the first and second rollers of the roller assembly provide two adjacent sides of the rectangular-shaped passageway and the peripheral surfaces of the first and second rollers of the second roller assembly of like construction provide the other two adjacent sides of the rectangular-shaped passageway.

* * * * *